US006844378B1

(12) United States Patent
Martin et al.

(10) Patent No.: US 6,844,378 B1
(45) Date of Patent: Jan. 18, 2005

(54) METHOD OF USING TRIAXIAL MAGNETIC FIELDS FOR MAKING PARTICLE STRUCTURES

(75) Inventors: James E. Martin, Tijeras, NM (US); Robert A. Anderson, Albuquerque, NM (US); Rodney L. Williamson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 215 days.

(21) Appl. No.: 10/324,254

(22) Filed: Dec. 18, 2002

Related U.S. Application Data

(60) Provisional application No. 60/346,316, filed on Jan. 4, 2002.

(51) Int. Cl.[7] .............................. C08J 3/28; C08K 3/08; C01B 31/00
(52) U.S. Cl. .......................... 523/300; 524/440; 419/1; 419/38; 427/598; 204/557; 264/428; 264/429; 264/434; 264/437; 264/29.3; 264/117
(58) Field of Search ........................ 523/300; 524/440; 419/1, 38; 427/598; 204/557; 264/428, 429, 434, 437, 29.3, 117

(56) References Cited

U.S. PATENT DOCUMENTS

| | | | | |
|---|---|---|---|---|
| 3,596,350 A | * | 8/1971 | Steingroever | ............... 29/598 |
| 4,321,222 A | * | 3/1982 | Moslener et al. | ........... 264/428 |
| 6,391,393 B1 | | 5/2002 | Martin et al. | |

OTHER PUBLICATIONS

Helgesen, et al., "Dynamic Behavior of Simple Magnetic Hole Systems," 1990 The American Physical Society, Physical Review A, vol. 42, No. 12, Dec. 15, 1990.

* cited by examiner

*Primary Examiner*—Stephen J. Lechert, Jr.
(74) *Attorney, Agent, or Firm*—Elmer A. Klavetter

(57) ABSTRACT

A method of producing three-dimensional particle structures with enhanced magnetic susceptibility in three dimensions by applying a triaxial energetic field to a magnetic particle suspension and subsequently stabilizing said particle structure. Combinations of direct current and alternating current fields in three dimensions produce particle gel structures, honeycomb structures, and foam-like structures.

20 Claims, 6 Drawing Sheets

(a)　　　(b)　　　(c)

METHOD OF USING TRIAXIAL MAGNETIC FIELDS FOR MAKING PARTICLE STRUCTURES his application claims the benefit of U.S. Provisional Application No. 60/346,316, filed on Jan. 4, 2002.

This invention was made with Government support under Contract No. DE-AC04-94AL85000 awarded by the Department of Energy. The Government has certain rights in the invention.

BACKGROUND OF THE INVENTION

The invention describes a method for producing particle structures using magnetic fields, and more particularly, a method for producing particle structures from a suspension of particles using a triaxial magnetic field.

There is considerable interest in particle composite materials with definable and controllable two- and tree-dimensional structures, which have applications such as structural materials, composite magnets and dielectrics, conducting adhesives, current-limiting thermistors, and recently, sensors. One of the main difficulties in designing particle composites is optimally organizing the particles for a particular purpose. In a typical composite, the particles are simply randomly dispersed, though some aggregation typically occurs before matrix polymerization. Some degree of structural control can be achieved if the particles have a significant permeability or permittivity mismatch with the matrix. Application of a uniaxial magnetic or electric field to such suspensions will organize such particles into one-dimensional chains, producing uniaxial Field-Structured Composites (FSCs). It is also possible to organize particles into two-dimensional sheets by subjecting a suspension to a biaxial field, such as an audio-frequency rotating field, thus producing biaxial FSCs. These composites have highly anisotropic magnetic and dielectric properties, and enhanced magnetostriction and electrostriction coefficients.

Field-structured materials are a recently-discovered class of materials possessing a substructure of ordered aggregates of suspended dielectric or magnetic particles. This substructure self-assembles under the influence of an external field, such as an external electric or magnetic field, and induces a wide range of mechanical, dielectric, magnetic, and optical properties. The mechanism of structure formation can be described as follows: When a magnetic particle suspension, consisting of multi-domain particles, is exposed to a uniaxial magnetic field, the magnetic dipole moment on the particles will generally increase and align with the applied field. The particles will then migrate under the influence of the dipolar interactions with neighboring particles, to form complex chain-like structures. If a magnetic particle suspension is instead exposed to a biaxial (for example, rotating) magnetic field, the induced dipole moments create a net attractive interaction in the plane of the field, resulting in the formation of complex sheet-like structures. Similar effects occur when suspensions of dielectric particles are subjected to uniaxial and biaxial electric fields. These materials can have large anisotropies in such properties as their conductivity, permittivity, dielectric breakdown strength, and optical transmittance.

A method to make isotropic structures that have enhanced properties in three dimensions (for example, orthogonal directions) could offer significant advantages over methods utilizing uniaxial or biaxial magnetic field methods, which can produce materials with enhanced properties in only one or two directions, respectively. Isotropic structures are not produced using uniaxial or biaxial fields, and it would seem that the use of a triaxial field would result in the cancellation of dipolar interactions that could lead to such three-dimensional structures.

DESCRIPTION OF SPECIFIC EMBODIMENTS

Figure 1:
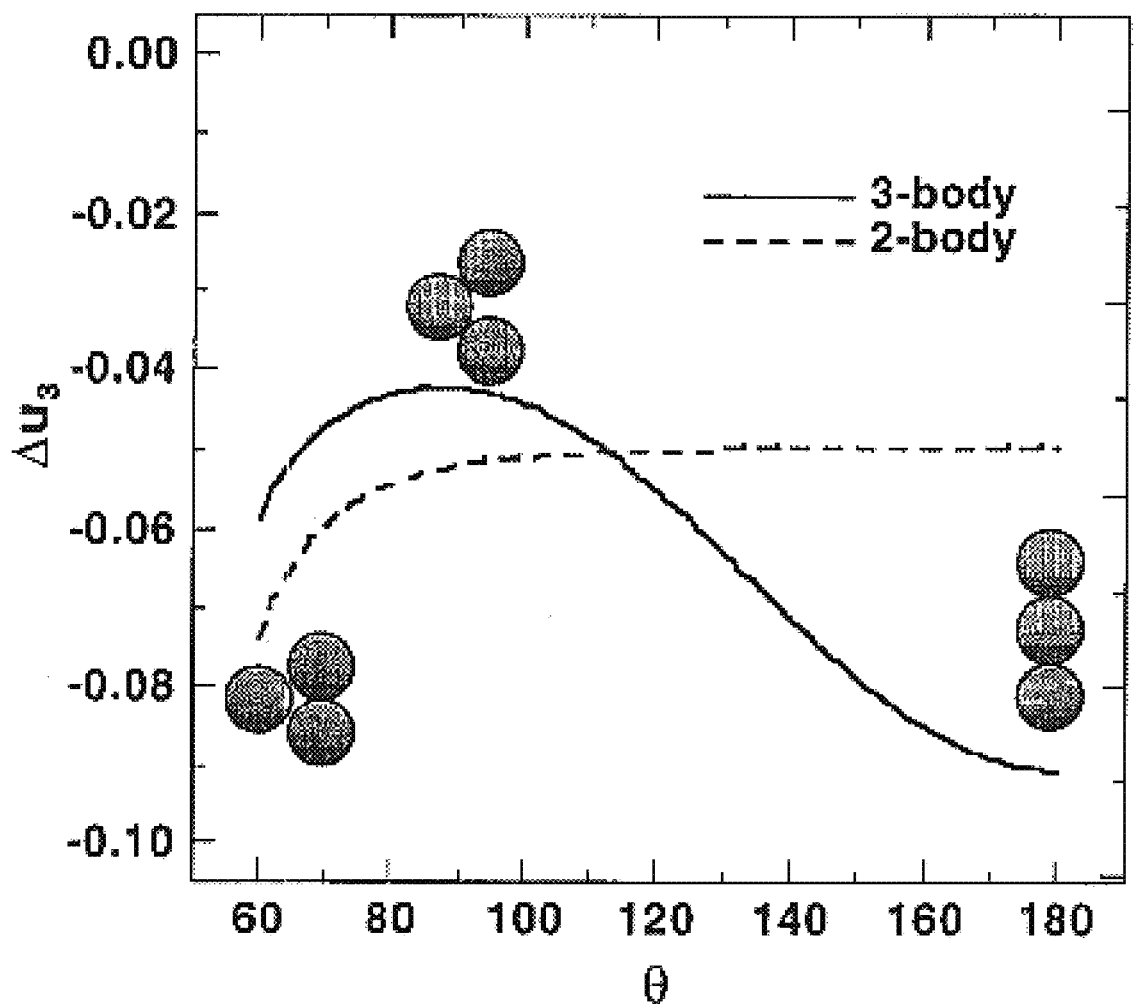
FIG. 1 illustrates the two-body and three-body interaction potential for a three-body chain.

The present invention is a method for producing three-dimensional particle structures using a triaxial electric or magnetic field where certain material properties, such as magnetic susceptibility, can be increased in all directions. Although both electric or magnetic fields can be equivalently used as the field in the method of the present invention, the ensuing description primarily describes only the use of magnetic fields; an electric field produces equivalent results in an equivalent manner.

In the method of the present invention, a particle suspension is formed and a triaxial (magnetic or electric) field is applied to the particle suspension in a manner such that second order and multibody particle interactions allow formation of three-dimensional particle structures. When a magnetic field is applied to a magnetic suspension, consisting of ferromagnetic particles in a liquid, or magnetic "holes" (for example, paramagnetic or diamagnetic particles) in a magnetic fluid such as a ferrofluid, the particles polarize and interact. A standard first-order approximation is that the dipole moments of the particles are due to the applied field alone. For small fields, the particle dipole moment is proportional to the field, to which it can be either parallel (magnetic particles) or antiparallel (magnetic holes). Because the potential depends on the square of the dipole moment, an applied field always creates. "positive" dipolar interactions and particle chaining: inverting the field or using particles or holes does not reverse the sign. The particles move in the field gradient created by the dipole moments of the nearby particles, and these dipolar interactions are well-described by a simple sum of pair-wise interactions. The interaction potential energy between two particles, calculated to first order (i.e. the particle polarization is due to the applied field alone) we shall denote as $V_z(r_y)$, where V is the potential energy, the subscript z denotes that the field is applied along an arbitrarily chosen z axis, and $r_z$ is the vector that runs between the particle centers.

It is also possible to create what we call "negative" dipolar interactions. Such interactions have a potential $-V_z(r_y)$ that is opposite in sign to the positive dipolar potential described in the paragraph above. The key to this is the application of a magnetic field whose direction is confined to the x-y plane orthogonal to the z axis, and whose time-dependent behavior is constrained such that the time-averaged projection of the field squared along the orthogonal x and y axes lying in the plane are equal. We call such a field a biaxial field. As a specific example of a biaxial field, consider a magnetic field whose direction continuously rotates in the x-y plane. We call this a rotating field. A rotating field can be produced by two orthogonal pairs of Helmholtz coils in quadrature phase. When a particle suspension is subjected to a low-frequency rotating field, particle chains form that co-rotate with the field. But if the rotation frequency is increased, the particle chains will become shorter because of hydrodynamic drag, until an upper frequency is reached where chains are no longer stable. At still higher frequencies, particles will experience a time-averaged interaction that in the first-order approximation is a negative dipolar interaction. Negative dipolar interactions lead to the formation of particle sheets in the field plane.

The simultaneous application of a biaxial field of root-mean-square (rms) component amplitude $H_0$ in the x-y plane and an ac (literally "alternating current," but in this usage sinusoidally time varying) or dc (literally "direct current," but in this usage constant) field of rms amplitude Ho along the z axis will be termed a balanced triaxial field. To first order, a balanced triaxial field generates no interactions at all, since $V_{xyz}(r_v) = V_z(r_v) + V_{xy}(r_v) = 0$, but in fact a second-order effect gives rise to unexpected isotropic dipolar interactions that can be utilized in making materials according to the present invention.

To compute the dipole interactions to second order (that is, exactly in the point dipole approximation) one must take into account that the field that polarizes the dipoles is the local field, which for a system of two dipoles is the sum of the applied field and the field due to the other dipole. In addition, the polarization of a particle dipole is actually affected by its own polarization, limiting the magnetic susceptibility of a spherical particle to $\chi = 3\beta$, where $\beta = (\chi_p - \chi_1)/(3 + \chi_p + 2\chi_1)$ in terms of the magnetic susceptibilities $\chi_p$ and $\chi_1$ of the materials of which the particle and liquid phases are composed. For magnetic particles, $\beta$ can be as large as 1; for magnetic holes, as small as $-\frac{1}{2}$.

The effect of the local field is to cause the two dipoles to tilt and change magnitude, significantly altering their interaction. By solving for the local field self-consistently, the two-body force between particles in a uniaxial field can be obtained where this force has a radial term that acts along the interparticle vector and a tangential term that acts normal to this. The radial force can be attractive or repulsive. In the special case of a balanced triaxial field, the time average of the tangential force is zero.

Including the effect of the local field on the dipole moments has broken the cancellation symmetry of these interactions. The magnitude of the interaction force between two dipoles in a balanced triaxial field can be shown to be $$F_{xyz} = -72\pi a^2 \beta^3 \mu_o H_o^2 (a/r)^7 (2-\xi)/[(1-2\xi)^2(1+\xi)^2] \quad (1)$$

where a is the particle radius, $\mu_o$ is the vacuum permeability, r is the magnitude of the vector between particle centers, $\xi = \beta(a/r)^3$, and $H_o$ is the rms applied magnetic field. This "centrosymmetric" force decays as the inverse seventh power of distance, and is reminiscent of a London dispersion force. The magnitude of this balanced triaxial force is surprisingly large: for contacting magnetic spheres it is roughly half that of the dipolar force generated by a field applied along the line of particle centers, and is thus many orders of magnitude greater than $k_B T$ for micron-size particles. It depends on the cube of the contrast parameter $\beta$, so both attractive (magnetic particles) and repulsive (magnetic holes) interactions are possible. For example, polystyrene particles in a ferrofluid act as magnetic holes and repel in a triaxial magnetic field.

The application of triaxial electric field to suspensions of dielectric particles is completely analogous. Again, both attractive and repulsive interactions can be generated, and equation 1 applies, with $H_o$ in this case denoting the rms applied electric field and $\mu_o$ in this case denoting is the vacuum permittivity. In aqueous, dielectric suspensions, colloids such as polystyrene are normally dielectric holes, so a triaxial electric field would create a repulsion in many practical cases.

In a system of many particles it is often true that the potential of interaction can be expressed as a sum of pair-wise interactions between all pairs of particles. Examples include the forces that act between particles in suspension in the absence of applied magnetic or electric fields. An attractive centrosymmetric force leads to standard phenomena such as clustering of spherical particles into droplets or the development of spinodal structures. At low temperatures a periodic solid is expected to emerge. This is not what we have observed in either simulations or experiments, suggesting that balanced triaxial interactions are dominated by many body effects.

To understand the interactions in aggregations of dipoles, one must self-consistently compute the individual dipole moments. In other words, each dipole is polarized in the applied field plus the field due to all the other dipoles. Energies can then be assigned to each moment according to the formula $U_1 = -0.5 \, \mu_o M_i \cdot H_o$, where $m_i$ is the dipole moment of the particle and $H_o$ is the applied field, where $U_1$ represents the change in magnetic energy when a dipole is brought into the applied field and then moved into its final position in the aggregation, and $\mu_o$ is the vacuum permeability. This energy will be normalized by the magnitude of the energy of an induced dipole brought into the uniform field but still far from other moments, $0.5 \, \mu_o m_o H_o$, where $m_o$ and $H_o$ are rms values.

In the case of biaxial or triaxial fields, one can average the dimensionless interaction energy over the two or three orthogonal field directions, e.g. in a triaxial field. It can be shown that this average dimensionless energy in a triaxial field is equal to the dipole energy in a triaxial field divided by the energy reduction of an isolated dipole in a triaxial field, and likewise for the biaxial case.

The dimensionless mean interaction energy for uniaxial, biaxial or triaxial fields is obtained by averaging over all dipoles in an aggregation. For isolated dipoles this interaction energy is zero. For aggregations such as chains and sheets, this energy converges to well-defined limits for large numbers.

To illustrate the importance of many-body effects, the interaction potential of a three particle chain can be derived in a balanced triaxial field with $\beta > 0$. This 3-body potential is shown in FIG. 1 for $\beta = 1$, over the physically accessible region $60° \leq \theta \leq 180°$, where $\theta$ is the angle of the interparticle vector to the applied field. This potential has a double well, with a global minimum at $\theta = 180°$, and a maximum at approximately 87°. If the three-body potential were given by a sum of pair-wise interactions, also plotted in FIG. 1, the potential would have a single well at the minimum 60° "bond" angle. In reality, the interaction between the two end particles is strongly moderated by the central particle, leading to a double potential well with a global minimum at 180°—a linear chain. (The configuration with the largest angularly averaged magnetic susceptibility.) In a uniaxial field a chain will form as well, but in a triaxial field there is no preferred orientation, so the chain can be rotated without overcoming a magnetic torque.

This 3-body calculation shows that the short-ranged nature of the pair interaction in Eq. 1 is misleading. The widely separated pendant particles actually interact strongly via polarization of the intermediate particle.

Subsequent analysis and simulations have shown that the dipole interactions cannot be decomposed into a sum of dipole-pair interactions. Because of this a rich variety of structures, including molecular-like clusters, emerge that would not be possible with an attractive, centrosymmetric pair potential. We have also shown that in multi-dipole aggregations, balanced triaxial fields produce dipolar interactions with the same $1/r^3$ power law as found with uniaxial or biaxial applied fields, and that the interaction magnitudes can be comparably large in all of these field configurations.

These analyses and simulations have resulted in a method for utilizing a triaxial magnetic field to produce three-dimensional particle structures with enhanced properties, for example magnetic susceptibility, in all three dimensions. Results show that magnetic susceptibility can increase by more than a factor of two compared to the untreated particle suspension and that this increase occurs in all directions. Likewise, the electrical and thermal conductivities of particle composites structured in a triaxial magnetic field can be many decades of magnitude larger than that of a random particle composite. The particle structures produced can be isotropic, with equivalent physical properties when measured along three orthogonal directions, or can have controlled anisotropies, by either introducing slight field component imbalances, or by other means described herein.

In one embodiment, a particle suspension is subjected to a rotating field generated by producing two ac fields of the same frequency in quadrature phase in the x-y plane and an incommensurate frequency ac or dc field along the z axis. By incommensurate, it is meant that the frequency is not the same as the frequency of the other considered fields. This method leads to highly effective mixing of a particle suspension, including vortex formation. Fields can have equal or imbalanced rms amplitudes. The ac field components can also be amplitude modulated.

The particle suspension comprises a suspension of magnetic particles in a liquid, where the liquid can be any liquid capable of producing a particle suspension, comprising both nonpolar and polar liquids. Typical liquids can include polymers, such as thermoplastic polymers, and resins such as polymerizable resins. The magnetic particles can be of arbitrary size and size distribution but will typically be less than about 100 microns in diameter.

In another embodiment, a particle suspension is subjected to a biaxial field produced using two incommensurate frequencies with no phase relation in the x-y plane and a generated dc field along a third (z) axis. This embodiment typically leads to particle gel formation. Fields can have equal or imbalanced rms amplitudes. The ac field components can be amplitude modulated.

In another embodiment, a particle suspension is subjected to a biaxial field produced using two incommensurate frequencies with no phase relation in the x-y plane and an incommensurate ac field along a third axis. The fields can have equal or imbalanced rms amplitudes. Again, the ac field components can be amplitude modulated.

If the two frequencies in the biaxial field are close enough together (a difference of less than approximately 100 Hz and more typically less than 10 Hz) such that the particle suspension dynamics can follow the field beating, then an oscillation between a two dimensional and three dimensional field occurs. This causes particle sheets to form in the suspension that alternately align in two orthogonal planes. This is referred to as two-dimensional heterodyning. During subsequent polymerization, this can lead to a cellular particle structure reminiscent of a wax honeycomb.

If the three frequencies are close enough together (a difference of less than approximately 100 Hz and more typically less than 10 Hz) such that the particle suspension dynamics can follow the field beating, then a complex oscillation occurs that leads to sheets forming alternately in planes normal to any of the four body diagonals of a cube whose faces are normal to the applied magnetic field components. This is referred to as three-dimensional heterodyning. During polymerization, this can lead to structures reminiscent of an open cellular foam. These structures have enhanced physical properties, such as magnetic susceptibility, thermal conductivity and electrical conductivity in all directions.

While the particle suspension is subjected to the triaxial field to produce particle structures, various processes can be used to makes these structures permanent. The structures are stabilized, by which is meant that subsequent application of a triaxial field to the structure does not significantly change the structure or its properties. These processes include solidification of the liquid phase by temperature reduction or polymerization, and welding the particles together by electrodeposition, electroless deposition, or sintering. In addition, it is possible to produce particle structures from a dry powder. Shaking the dry powder can help to disperse it throughout the container volume as the field is applied, or the field can be designed to agitate the sample. These structures can be fixed by the means described above, especially by sintering.

A variety of experimental effects were observed with balanced or imbalanced triaxial fields. To create a uniform triaxial magnetic field, three nested orthogonal Helmholtz coil pairs were constructed. One pair was run dc with a current source, or ac with a fixed capacitor in series to create a resonant circuit, and the other two pairs were run ac to create a biaxial field. The two ac-only coils were connected to tunable, computer-controlled, series-parallel capacitor banks to create low impedance series resonant circuits with high quality factors. Driving these circuits with an ordinary audio amplifier, it was possible to create magnetic induction fields as large as 500 G at frequencies up to approximately 1500 Hz. Amplifier input signals are provided by a phase-locked digital signal synthesizer. The actual field strengths and frequencies that can be used depend on the capabilities of the equipment and are not limited by the method of the present invention. The field strengths and frequencies required to produce particle structures depend on the characteristics of the particle suspension.

Applying a field rotating at frequencies of even a few hundred Hz causes significant magnetically-induced torques on the particles, for a number of reasons When a dc field is simultaneously applied to create a triaxial field, these particle torques produce spectacular vortices in the suspension, even causing the fluid to climb up the side of a container when the plane of the rotating field is vertical. The angular velocity of the vortices is strongly dependent on the magnitude of the dc field, and a large bias (by "bias" we mean the rms amplitude of this field component is larger than that of the other two) is helpful. When viewed along to the dc field, the vortices appeared to consist of whirling particle chains, providing a convenient method of stirring up sedimented particles, but not of creating any static structures.

There are a number of ways to eliminate vortex formation. One practical method is to operate one coil at a frequency much different than the other. When one coil was operated at twice the frequency of the other, a figure eight Lissajous pattern (a parametric plot of $H_x$ versus $H_y$, with time the parameter) was created for the biaxial field vector, still with a dc field normal to the biaxial field. This reverses the direction of field rotation once during each field cycle, creating an alternating particle torque of zero mean. Applying orthogonal fields of arbitrary frequencies will have a similar effect, as long as the beat frequency is fast compared to structural organization times. These methods produced static structures, but with obvious anisotropies.

Figure 2:
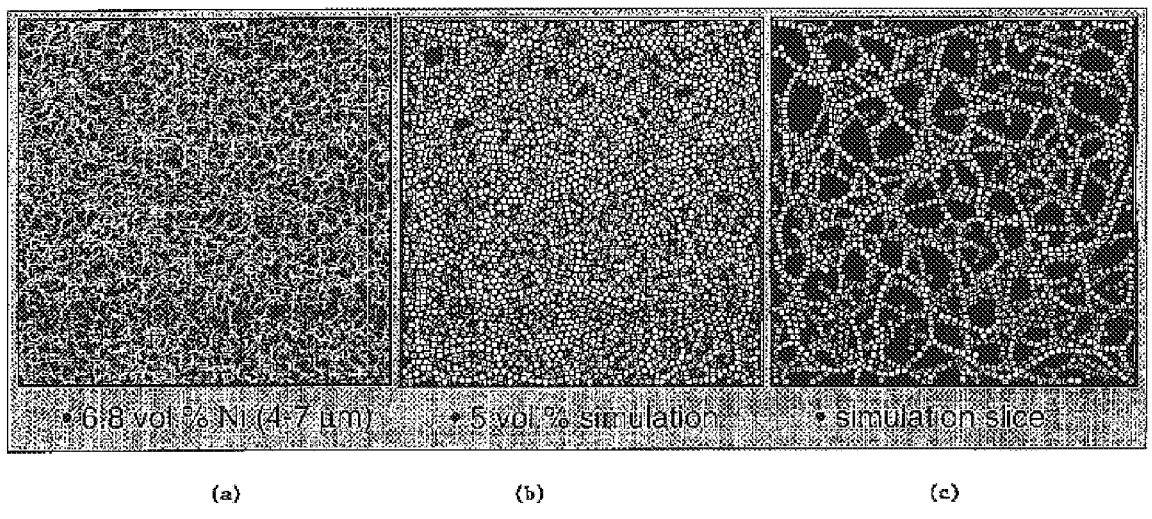
FIG. 2 shows the actual and simulated particle structure produced with a balanced triaxial field.

To create the isotropic particle gel illustrated in FIG. 2, 100 Oe rms fields were applied at frequencies of 160 Hz, 180 Hz, and 203.7 Hz to a 4–7 $\mu$m Ni particle dispersion at 6.8 vol.%. A polyester resin was used as the suspending fluid, and gelation occurred in approximately 20 minutes at ambient temperature. The gel appears to consist of chains in all orientations, not sheets. FIG. 2a shows an illustration of the actual structure while FIGS. 2b and 2c illustrate the result of numerical simulations of the method of the present invention.

Figure 3:
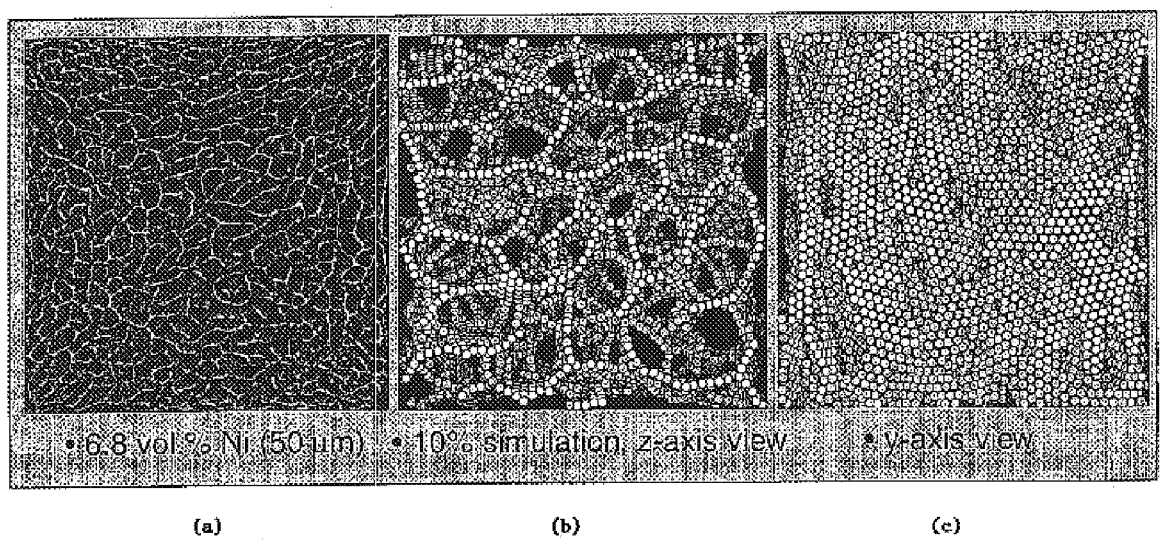
FIG. 3 shows the actual and simulated particle structure produced with a uniaxial field bias.
Figure 4:
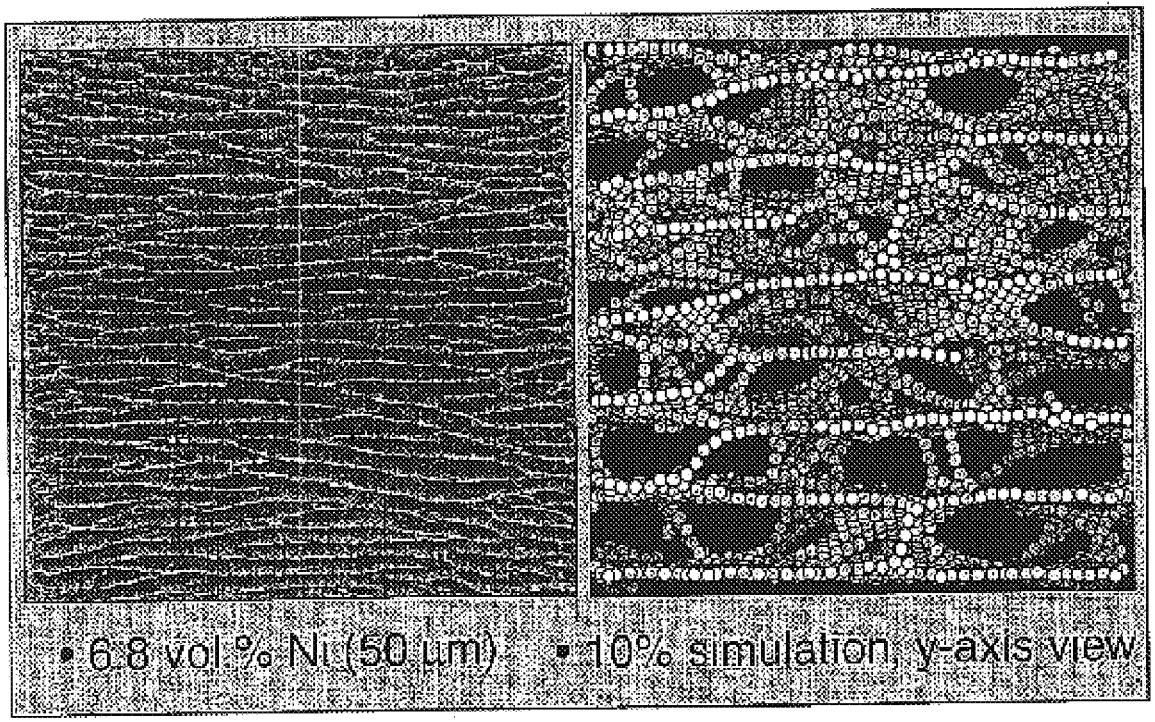
FIG. 4 shows an actual and simulated layered particle structure produced with a triaxial field.

Experiments and numerical simulations have also shown that the structure of 3-D particle foams can be controlled by biasing the field amplitudes. For example, a triaxial field with a uniaxial field bias was obtained by increasing the 180 Hz, z-axis field to 125 Oe rms from the previous example, producing a uniaxial field bias. In this case, a suspension of 50 $\mu$m particles forms a structure of highly irregular pores with holey walls, as illustrated in FIGS. 3a, 3b, and 3c, where FIG. 3a again illustrates the actual structure obtained by one embodiment of the method of the present invention and FIGS. 3b and 3c represent numerical simulations. Conversely, a triaxial field with a biaxial field bias was obtained by decreasing the 180 Hz, z-axis field to 80 Oe rms. Under these conditions a layered structure emerges as illustrated in FIGS. 4a–c. Even small field imbalances lead to structures with pronounced anisotropies, so for particles without appreciable roughness, good field precision is required to achieve isotropic triaxial composites.

Figure 5:
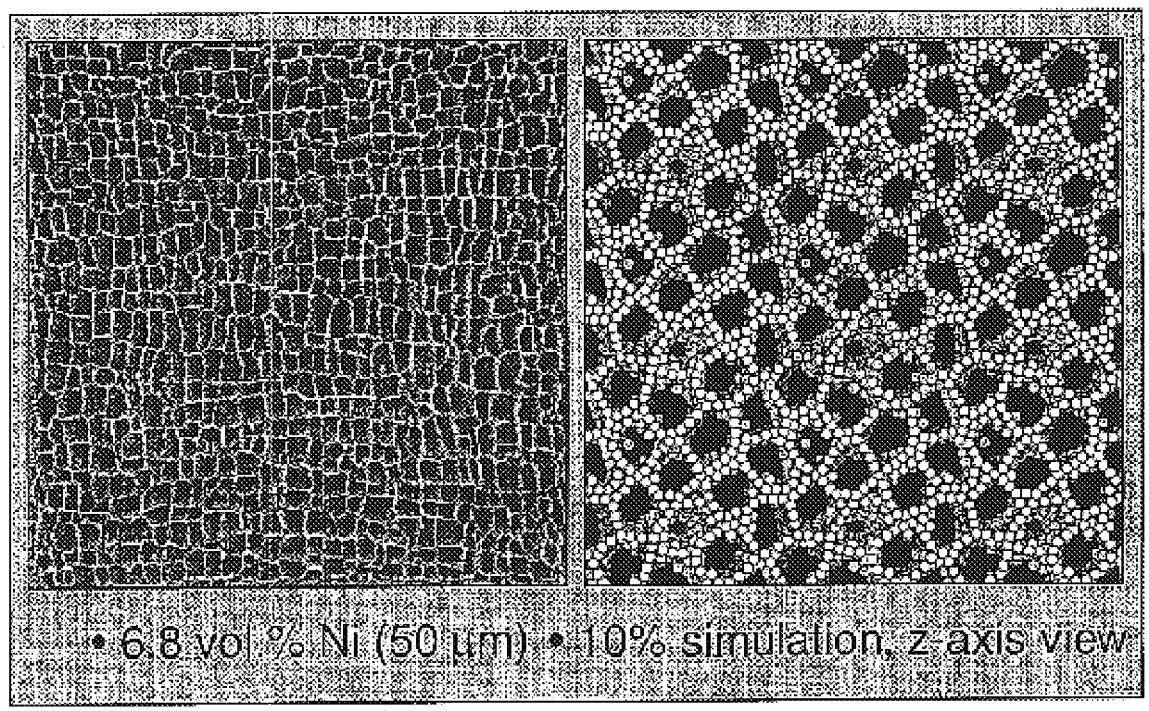
FIG. 5 shows the actual and simulated particle structure produced with a triaxial field utilizing heterodyning.

Heterodyning occurs by adjusting the field frequencies to be close enough such that a slowly beating occurs between field components. As a specific example of this, the frequency of the z-axis coil was set to 250 Hz, the x-axis coil to 202.7 Hz, and the y-axis coil to 203.7 Hz. This creates a 1-Hz phase modulation of the field in the x-y plane, which the particles are able to follow. In this plane, the field beats between a uniaxial field at ±45° to the x-axis, and a rotating field. We call this two dimensional heterodyning. When a z-axis field is added, the three fields combined beat between a triaxial and a biaxial field, leading to interesting particle dynamics. The particle suspension forms sheets parallel to the z-axis, but at +45° to the x-axis, then these sheets disappear and reform at −45° to the x-axis. The sheets do not continuously rotate and ultimately gives rise to structures with exceedingly deep pores, as illustrated in FIGS. 5a and 5b, showing an illustration of the actual produced structure and a simulated structure.

Figure 6:
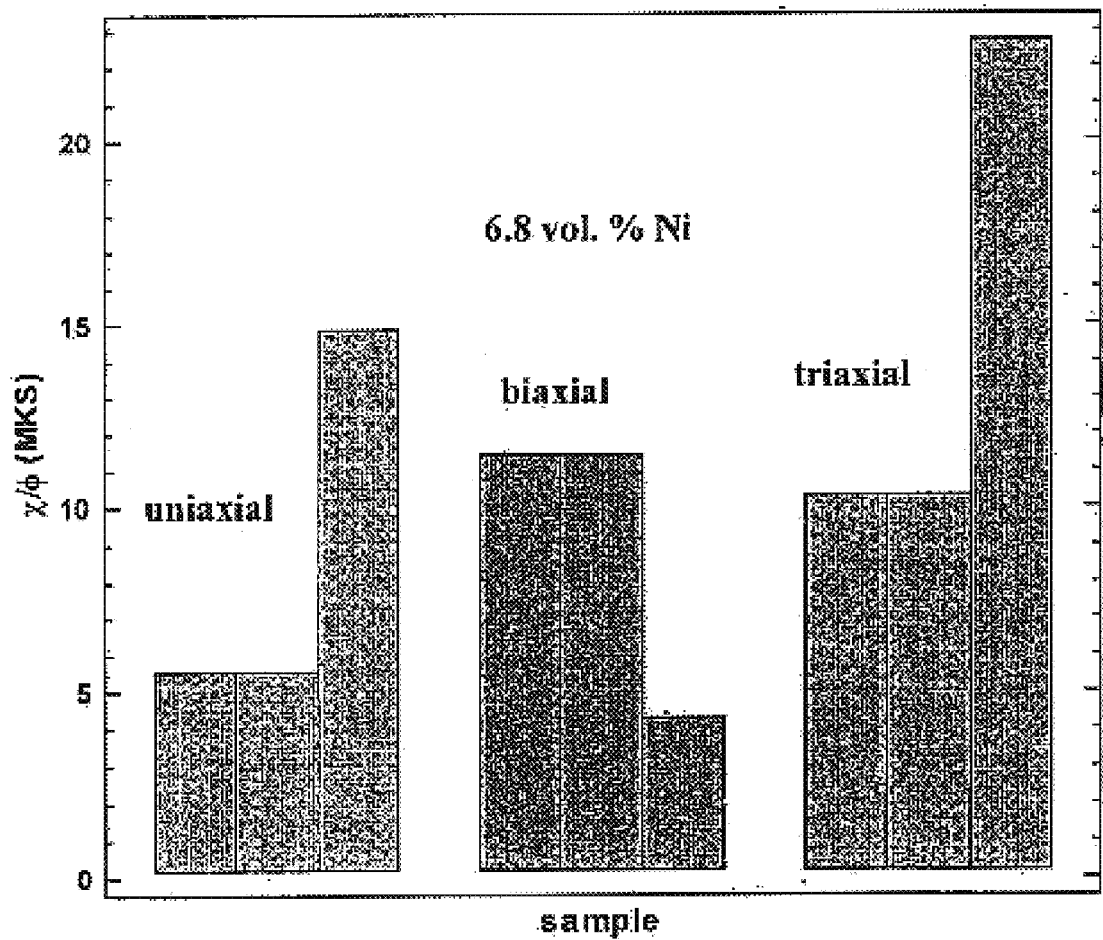
FIG. 6 shows the increase in magnetic susceptibility in three dimensions of a sample subjected to a triaxial magnetic field.

Heterodyning can also be done in three dimensions by simply adjusting the z-axis field frequency to some value near the other two frequencies. This results in curious particle dynamics, with sheets suddenly appearing normal to one or the others of the four body diagonals of a cube whose faces are normal to the cylindrical axes of the coils. Transitions from one sheet orientation to another are abrupt. Any of the single field components can also be amplitude modulated. FIG. 6 shows how the use of heterodyning increases the ratio of the magnetic susceptibility to volume fraction of particles in the liquid ($\chi/\phi$) can be increased in all directions when the suspension of Ni particles is subjected to a triaxial field, as compared to being subjected to a uniaxial or biaxial field. The three bars in the figure for each type of field applied represents the three orthogonal directions in the sample along which measurements were made.

EXAMPLES

Example: A suspension of 4–micron Ni particles in silicone oil was subjected to a rotating field at a frequency of 200 Hz. The rms amplitude of each of the component magnetic fields was 100 Oe. When a dc field was applied normal to the rotating field plane, the suspension formed hydrodynamic vortices. The rotational frequency of the vortices was controlled over a wide range by adjusting the magnitude of the dc field. The dc field was varied from 50 Oe to 200 Oe.

Example: A suspension of 4–micron Ni particles in polyester resin was subjected to a rotating field at a frequency of 200 Hz. The rms amplitude of each of the component magnetic fields was 100 Oe. When an ac field at 400 Hz and 100 Oe was applied normal to the rotating field plane, the suspension formed a particle gel structure that was fixed by the polymerizing resin.

Example: A suspension of 4–micron Ni particles in polyester resin was subjected to a biaxial field with one component at 200 Hz and the other at 400 Hz. The rms amplitude of each of the component magnetic fields was 100 Oe. When a dc at 100 Oe was applied normal to the biaxial field plane, the suspension formed a particle gel structure that was fixed by the polymerizing resin.

Example: A suspension of 4–micron Ni particles in polyester resin was subjected to a biaxial field with one component at 160 Hz and the other at 180 Hz. The rms amplitude of each of the component magnetic fields was 100 Oe. When an ac field at 203.7 Hz and 100 Oe rms amplitude was applied normal to the biaxial field plane, the suspension formed a particle gel structure that was fixed by the polymerizing resin.

Example: A suspension of 4–micron Ni particles in polyester resin was subjected to a biaxial field with one component at 160 Hz and the other at 180 Hz. The rms amplitude of each of the component magnetic fields was 100 Oe. When an ac field at 203.7 Hz and 125 Gauss rms amplitude was applied normal to the biaxial field plane, the suspension formed an anisotropic cellular particle foam structure that was fixed by the polymerizing resin. The cells are normal to the biaxial field plane.

Example: A suspension of 4–micron Ni particles in polyester resin was subjected to a biaxial field with one component at 160 Hz and the other at 180 Hz. The rms amplitude of each of the component magnetic fields was 100 Oe. When an ac field at 203.7 Hz and 80 Oe rms amplitude was applied normal to the biaxial field plane, the suspension formed a layered particle structure that was fixed by the polymerizing resin. The layers form in the plane of the biaxial field.

Example: A suspension of 4–micron Ni particles in polyester resin was subjected to a biaxial field with one component at 202.7 Hz and the other at 203.7 Hz. The rms amplitude of each of the component magnetic fields was 100 Oe. When an ac field at 250 Hz and 100 Oe rms amplitude was applied normal to the biaxial field plane, the suspension formed a honeycomb structure during resin polymerization. The cells of the honeycomb are normal to the biaxial field plane. Increasing the amplitude of the z-axis field to 125 Oe led to deeper and more regular cells.

Example: A suspension of 4–micron Ni particles in polyester resin was subjected to a biaxial field with one component at 203.2 Hz and the other at 203.7 Hz. The rms amplitude of each of the component magnetic fields was 100 Oe. When an ac field at 204.2 Hz and 100 Oe rms amplitude was applied normal to the biaxial field plane, the suspension formed a particle foam structure during resin polymerization. The particle foam had no preferred direction of orientation. Well before polymerization, the particles undergo a complex dynamics, with sheets appearing and disappearing.

Example: A suspension of 4–micron Ni particles in polyester resin was subjected to a biaxial field with one component at 203.2 Hz and the other at 204.2 Hz. The rms amplitude of each of the component magnetic fields was 100 Oe. When an amplitude modulated ac field at 203.7 Hz and 100 Oe rms amplitude was applied normal to the biaxial field plane (modulation frequency of 1.2 Hz) the suspension formed a particle foam structure that was trapped by the polymerizing resin. The particle foam had no preferred direction of orientation.

The application of a triaxial field to magnetic or dielectric particles according to the method of the present invention offers a means of optimizing the isotropic susceptibility of produced particle structures, can maximize charge and heat transport in metal particle composites, and create conductivity or capacitance-based sensors with tailored response. Composites with tailored mechanical or viscoelastic properties can be produced. Metal filter materials or catalyst supports can be made by sintering or plating the particles together. Triaxial electric fields can also be used to deflocculate aqueous colloidal suspensions consisting of dielectric holes. When applied to superparamagnetic nanoparticles, exotic foams of superparamagnetic particles can be made with highly optimized isotropic magnetic properties.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for producing a three-dimensional particle structure, comprising:
   forming a magnetic or dielectric particle suspension;
   applying a triaxial field to said particle suspension, said triaxial field selected from a magnetic field and an electric field, wherein a three-dimensional particle structure is formed.

2. The method of claim 1 further comprising the step of stabilizing said three-dimensional particle structure.

3. The method of claim 2 wherein said step of stabilizing said three-dimensional particle structure is performed by a process selected from temperature reduction, polymerization, electrodeposition, electroless deposition and sintering.

4. The method of claim 1 wherein forming a magnetic particle suspension is performed by dispersing magnetic particles in a nonmagnetic liquid medium.

5. The method of claim 1 wherein forming a magnetic particle suspension is performed by dispersing nonmagnetic particles in a magnetic liquid medium.

6. The method of claim 1 wherein forming a dielectric particle suspension is performed by dispersing dielectric particles in an insulating liquid medium.

7. The method of claim 1 wherein the particles in dry powder form are dispersed into a volume comprised of a gas or vacuum.

8. The method of claim 1 wherein applying the triaxial field is performed by generating a rotating field in an x-y planar dimension, said rotating field generated by a method selected from producing two alternating current fields of the same frequency in the quadrature phase and a rotating fixed magnet, and generating a field, selected from an alternating current or direct current field, at an incommensurate frequency along a non-planar axis.

9. The method of claim 8 wherein said biaxial field and said direct current field have rms component amplitudes selected from equal rms component amplitudes and imbalanced rms component amplitudes.

10. The method of claim 8 wherein said alternating fields can be selected from amplitude modulated and frequency modulated fields.

11. The method of claim 1 wherein applying the triaxial field is performed by generating a biaxial field in an x-y planar dimension, said biaxial field generated using two incommensurate frequencies, and generating a direct current field or an ac field with a third frequency along a non-planar axis.

12. The method of claim 11 wherein said biaxial field and said direct current field have rms component amplitudes selected from equal rms component amplitudes and imbalanced rms component amplitudes.

13. The method of claim 11 wherein the two incommensurate frequencies of said biaxial field differ by less than approximately 100 Hz.

14. The method of claim 11 wherein the two incommensurate frequencies of said biaxial field and the third frequency of the direct current field differ by less than approximately 100 Hz.

15. The method of claim 4 wherein said magnetic particles are less than approximately 100 microns in diameter.

16. The method of claim 6 wherein said dielectric particles are less than approximately 100 microns in diameter.

17. The method of claim 4 wherein said nonmagnetic liquid medium comprises a liquid selected from a polymer and a resin.

18. The method of claim 4 wherein said nonmagnetic liquid medium comprises a liquid that can be solidified.

19. The method of claim 6 wherein said insulating liquid medium comprises a liquid selected from a polymer and a resin.

20. The method of claim 6 wherein said insulating liquid medium comprises a liquid that can be solidified.

* * * * *